(12) United States Patent
Brusky

(10) Patent No.: US 6,698,230 B1
(45) Date of Patent: Mar. 2, 2004

(54) ICE CHEST AND INSERT

(76) Inventor: Dan Brusky, 705 S. Webster Ave., Omro, WI (US) 54963

( * ) Notice: Subject to any disclaimer, the term of this patent is extended or adjusted under 35 U.S.C. 154(b) by 0 days.

(21) Appl. No.: 10/294,391

(22) Filed: Nov. 14, 2002

(51) Int. Cl.[7] .................. F25D 3/08; F25D 3/02
(52) U.S. Cl. .................. 62/457.7; 62/459; 62/372; 62/529
(58) Field of Search .................. 62/457.7, 457.2, 62/459, 464, 529, 371, 372

(56) References Cited

U.S. PATENT DOCUMENTS

| | | | |
|---|---|---|---|
| 2,850,885 A | * 9/1958 | Hohr et al. | 62/372 |
| 5,052,184 A | * 10/1991 | Jarvis | 62/60 |
| 5,845,515 A | 12/1998 | Nelson | 62/457.7 |
| 6,349,559 B1 | 2/2002 | Hasanovic | 62/475.7 |

* cited by examiner

*Primary Examiner*—Chen Wen Jiang

(57) ABSTRACT

An ice chest or cooler comprising a container including an insulating base and insulating sidewalls upstanding from the base. Within the container, a false floor is supported in spaced relation from the insulating base and permits heat transfer across its thickness. The false floor has a perimeter located close or adjacent to the insulating sidewalls and an ice feed tube is secured to the false floor. The feed tube has a bore that opens into the space between the false floor and the insulating base to permit passage of ice cubes through the bore into the space between the false floor and the insulating base. Ice can be thereby be fed into the space between the false floor and the base of the container without removing food or drink containers above the false floor.

19 Claims, 6 Drawing Sheets

ICE CHEST AND INSERT

FIELD OF THE INVENTION

This invention relates to coolers or ice chests and more particularly to an insert for placement within the container to separate food or drink from ice located below the insert for cooling the food or drink.

BACKGROUND OF THE INVENTION

In use of coolers or ice chests, food and/or drink (hereafter collectively referred to as "food") are located inside the ice chest together with ice cubes for cooling the food. To separate the ice and the food, it is known to employ a four legged table located on a layer of ice at the bottom of the cooler with food located on the table top. Heat transfer between the ice and the food through the thickness of the table provided cooling for the food but to replenish the ice, both the food and the table had to be removed from the cooler. Such an arrangement is inconvenient to users.

SUMMARY OF THE INVENTION

The invention seeks to provide an improved ice table to reduce and preferably to eliminate the above user inconvenience.

One embodiment of the invention is an insert for an ice chest having sidewalls upstanding from a base. The insert comprises a table top having dependent support legs and an ice feed tube extending through the table top such that, in use of the insert, the table top is located within an ice chest with the support legs resting on the base. The table top perimeter is located adjacent side walls of the ice chest, spacing the table top from the ice chest base thereby permitting pieces of ice, e.g. ice cubes, ice cubes fed into the feed tube from above the table top to pass through and exit the feed tube into the space between the table top and the base of the ice chest.

In another embodiment of the invention, an ice chest comprises a container including an insulating base and insulating sidewalls upstanding from the base. Within the container is a false floor supported in spaced relation from the insulating base and having a perimeter located close or adjacent to the insulating sidewalls. An ice feed tube secured to the false floor has a bore opening into the space between the false floor and the insulating base. The bore permits passage of ice pieces, e.g. ice cubes through the bore into the space between the false floor and the insulating base. The false floor permits heat transfer across its thickness, thereby facilitating cooling of articles, e.g. food and/or drink, located on and above the false floor.

Advantageously, the ice feed tube has peripheral sidewall slots at its exit end to facilitate passage of ice from the feed tube, and may have a bore about 2–3 times the maximum linear dimension of ice pieces to be fed through the tube.

The foregoing has outlined, relatively broadly, preferred and alternative features of the present invention so that those skilled in the art may better understand the following more detailed description of the invention. Additional features of the invention will be described hereafter. Those skilled in the art should appreciate that the disclosed concepts and embodiments of the invention can be used as a basis for design or modification to produce other structures for carrying out the same or similar purposes as the present invention. Those skilled in the art should also recognize that such equivalent constructions do not depart from the spirit and scope of the invention in its broadest form.

DETAILED DESCRIPTION OF EMBODIMENTS OF THE INVENTION

Figure 1:
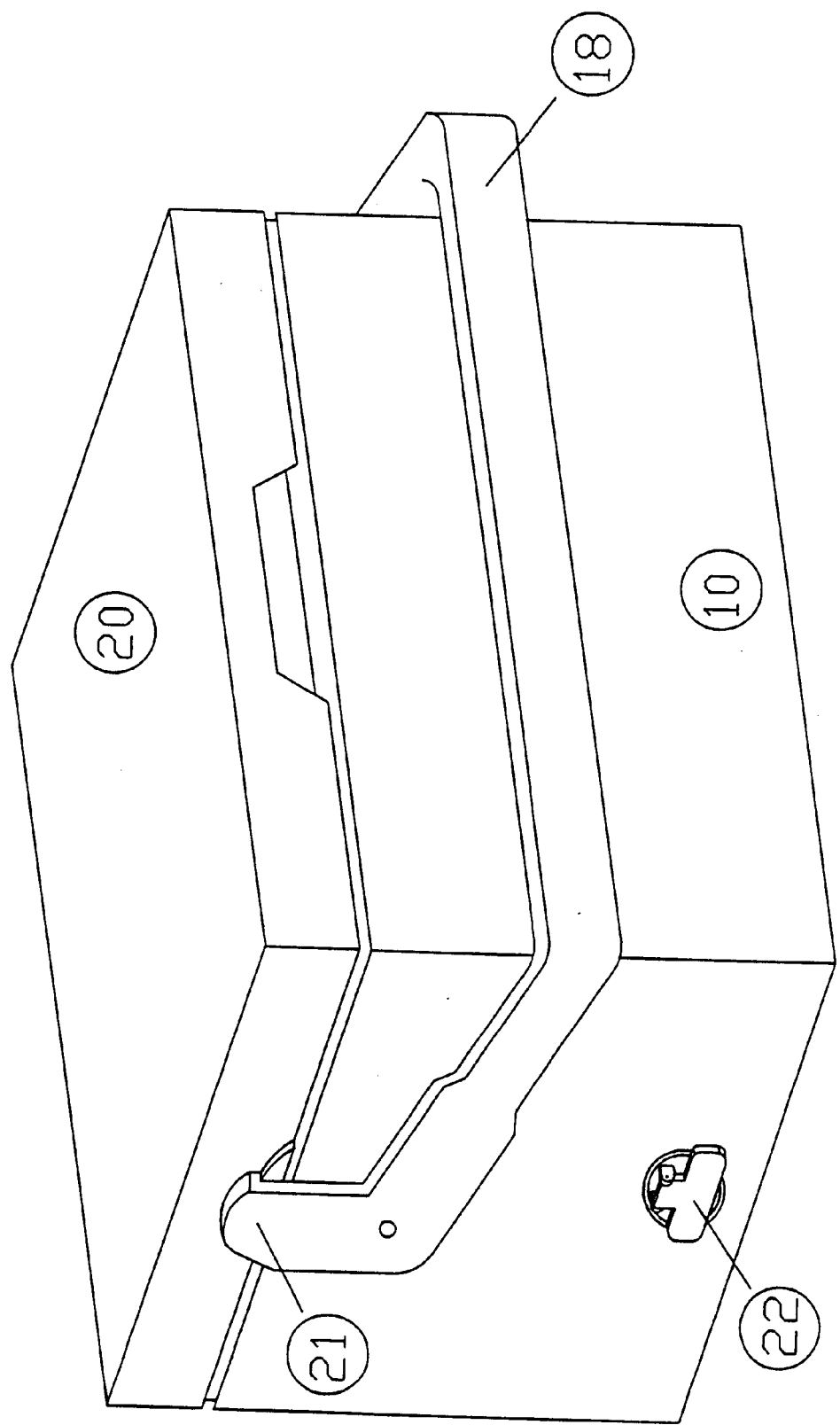
FIG. 1 is an isometric view of an ice chest in which an ice table embodying the present invention may be accommodated.

FIG. 1 depicts an ice chest or cooler 10 suitable for accommodating an ice table embodying the invention. The ice chest includes an insulating base having upstanding, integral, and pairs of insulating side walls. The ice chest also has a carrying handle 18 and an insulating cover or lid 20 that may be secured in place with fasteners 21 on the side walls. A valve 22 extends through one of the side walls to permit discharge of liquid, e.g. melted ice, from within the ice chest 10. In use, food and drink may be located within the ice chest together with ice cubes to maintain the food and drink cool. As thus far described, such ice chests are commercially available under a variety of brand names in various shapes and sizes, commonly having a rectangular base and walls as illustrated. The shape and size of the container are not critical to the features of an ice table embodying the invention, as will be apparent from the following description.

Figure 2:
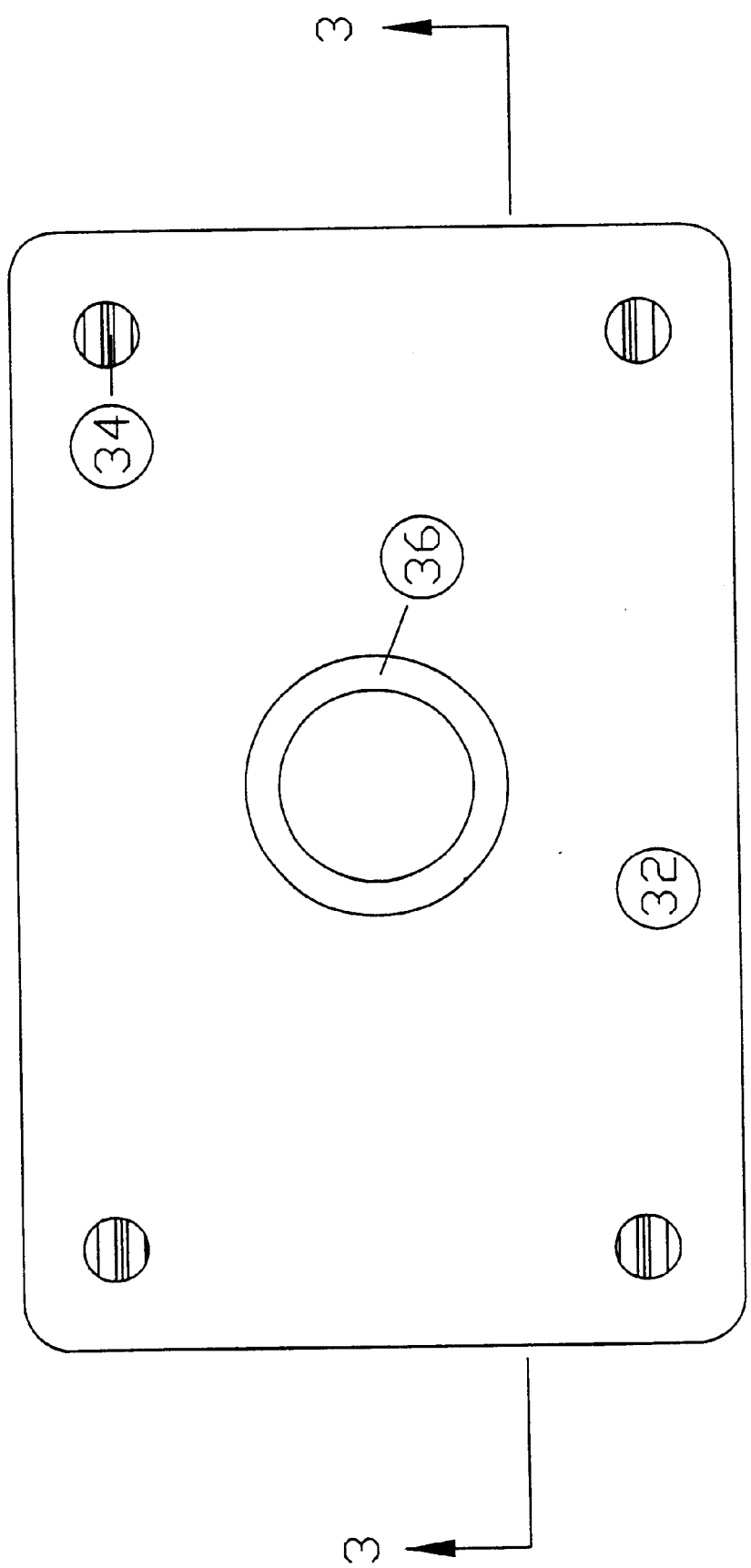
FIG. 2 is a top plan view of an ice table embodying the invention.
Figure 3:
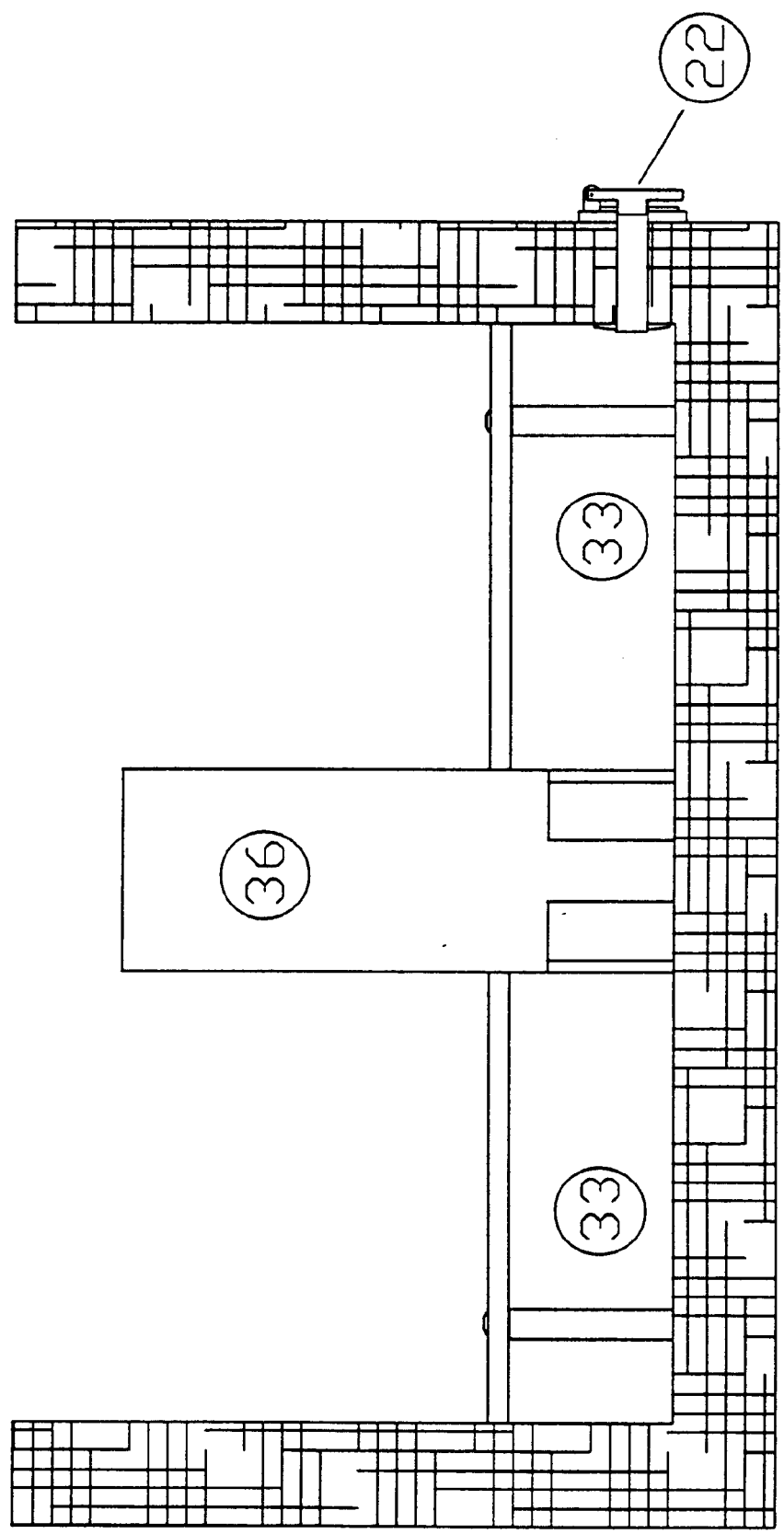
FIG. 3 is a cross section along the line 3—3 shown in FIG. 2, showing the ice table located in an ice chest such as shown in FIG. 1.
Figure 4:
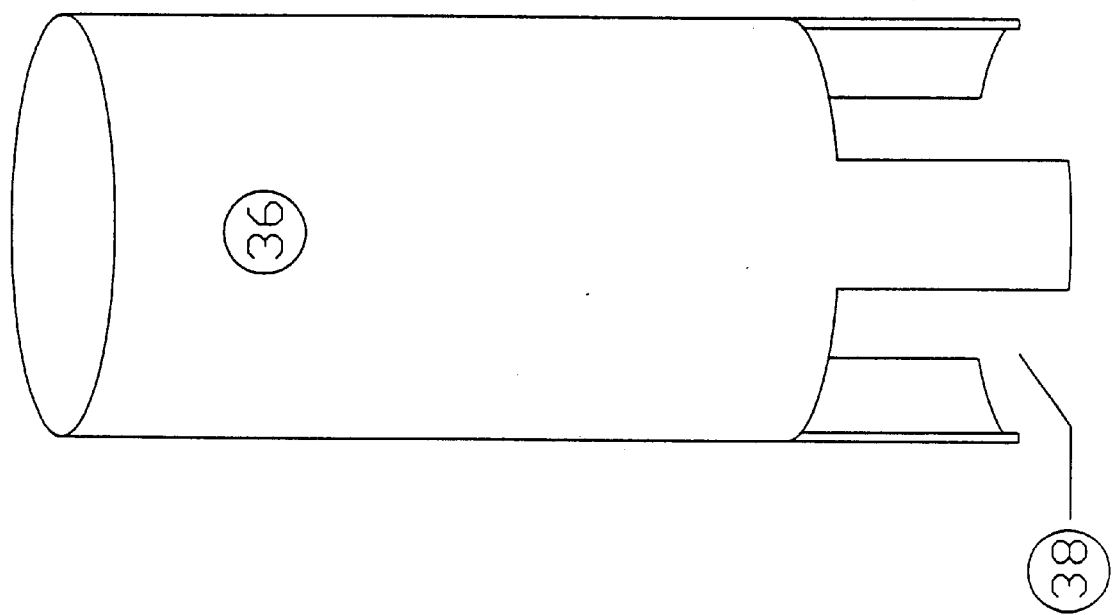
FIG. 4 is a larger scale isometric view of the tube forming part of the ice table shown in FIG. 3.

FIGS. 2, 3 and 4 illustrate an ice table embodying the invention which permits separation of food and ice cubes in the ice chest 10 while enabling replenishment of ice without the necessity of removing the table or the food from the ice chest. The table has a rectangular table top 32 that fits within the ice chest 10 so that it can readily be inserted into place and removed. The table top has four dependent legs 34, located at or close to the respective corners of the table top 32, resting on the inside of the base of the ice chest to support the table top in spaced relation with the base, so that ice cubes can be accommodated in the space 33 between the base and the table top 32. (Reference throughout this specification and the claims to "ice cubes" is in a generic sense and is intended to include other shapes, e.g. rectangular cubes, balls, "crescents", etc., as well as to ice pieces, particulate or crushed ice.) The table top 32 thus provides a false floor within the ice chest 10, on which food and drink can be located.

Extending through the thickness of the table top 32 is a an ice feed tube 36, the lower end of which preferable rests on the base of the ice chest and the upper end of which preferably extends to or just below the tops of the side walls. At its lower end, the walls of the tube have rectangular cutouts to form slots 38, three as shown although this is not an essential number. The tube 36 may be force-fitted in a circular hole in the table top 32 or may be fixed in place using a suitable adhesive. A circular cross section tube 36 is preferred but other cross sectional shapes, e.g. rectangular, hexagonal, etc., also could be employed.

Regardless of the cross sectional shape of the tube 36, its bore is chosen to permit ice cubes inserted at the upper end of the tube to pass freely to the lower end, and the slots 38 likewise are dimensioned permit the ice cubes to exit into the space 33 between the table top 32 and the base 12.

Preferably, the table top edges are slightly spaced from the interior walls of the ice chest to permit runoff of liquid or the table top me a more snug fit and have surface openings or edge slots for the same purpose.

In use, the ice table 30 can be placed inside the ice chest 10, while empty, with the legs 34 resting on the base. Food may then be placed on the table top 32 and ice cubes placed in the tube 36 at its upper end, dropping through the tube bore and exiting through the slots 38 into the space 33. Enough ice cubes may be added to substantially fill the space 33, shaking the container, if necessary, to distribute the ice cubes. Ice cubes may also be added to partly or completely fill the tube 36. The cover 30 can then be placed in position and latched to close the ice chest 10. Heat exchange through the thickness of the table top 32 between the ice cubes and cold water in the space 33 and food on the table top 32 cools the food. Ice contained in the tube 36 can enhance the cooling effect.

Water in the space 33 can be drained off using the valve 22 and ice replenished by feeding more ice cubes into the upper end of the tube 36, without having to remove food from the ice chest 10 or disturbing food on the ice table 30.

In the preferred embodiment, the ice table 32, the tube 36, and the legs 34 are made of plastic, but other materials may be used.

In a particular embodiment, suitable for use with ice cubes of maximum side dimension up to about 1 inch, a circular section tube 36 has been used, with a bore of about 3 inches. While a larger bore could be used, there is a trade-off between ease of ice flow down the tube 36 (and increased effective heat retransfer area of the tube) and area of the ice table 32 available for supporting food. Also in this embodiment, the table top 32 was about 0.25 inch thick and legs 34 about 3 inches high and ⅝ inch diameter were employed. The table top thickness and leg shape and dimensions are not critical beyond having the capability of providing adequate support for the likely weight of food to be held within the ice chest and enabling adequate heat transfer through the thickness of the table top 32 to facilitate the rate of cooling food on the table top. The internal dimensions of the ice chest 10 will determine the table top dimensions which, in turn, may also may affect the dimensions of the legs 34. As an approximate guide, assuming a circular bore tube 36 is employed, its bore typically would be about 2 to 3 times the largest side or lateral dimension or diameter of the ice cubes to be used.

Figure 5:
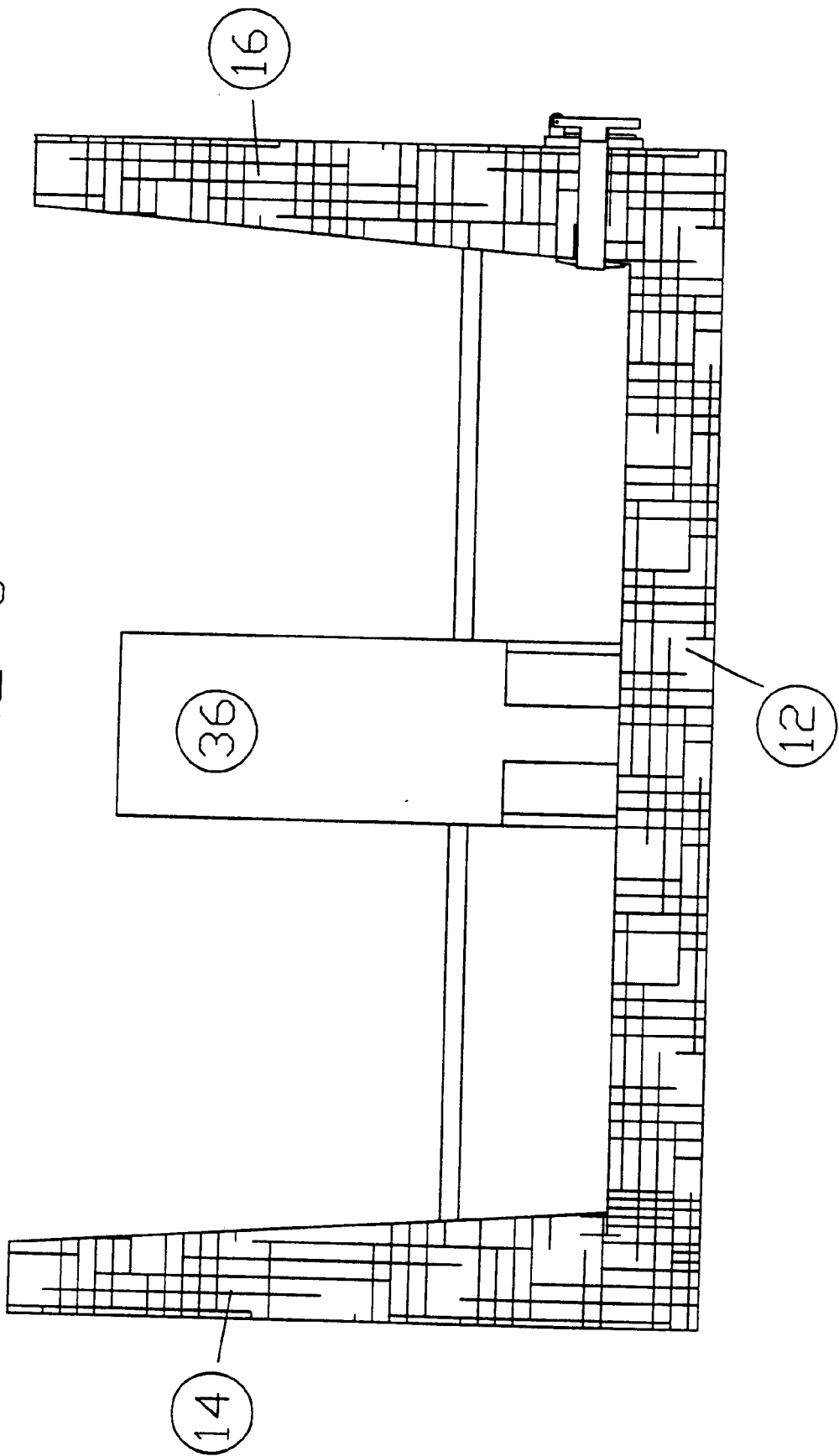
FIG. 5 is a vertical cross section of an ice chest having sloping internal sidewalls for supporting an ice table embodying the invention.
Figure 6:
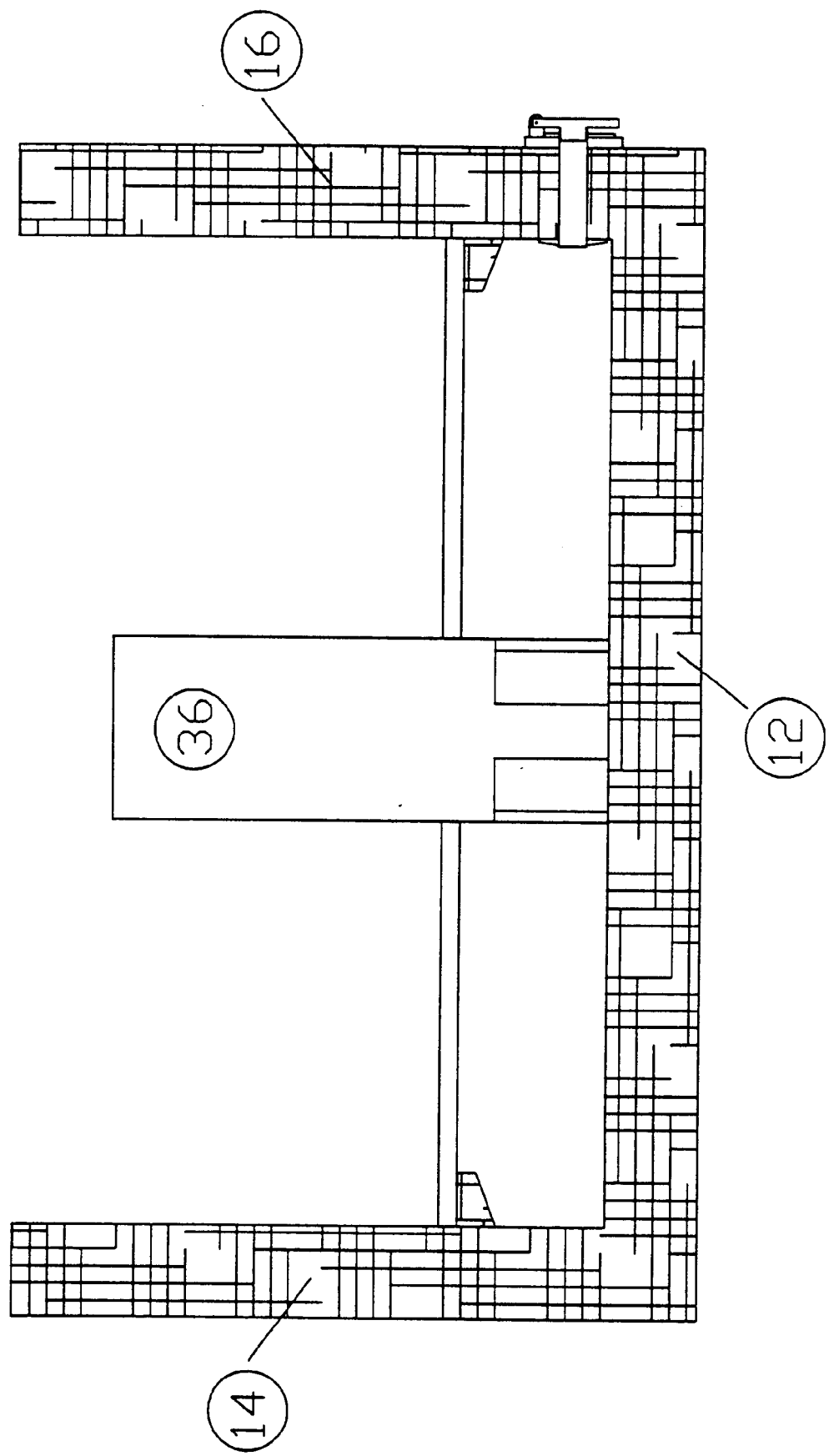
FIG. 6 is a vertical cross section of an ice chest having ledges on internal sidewalls for supporting an ice table embodying the invention.

In alternative embodiments, a tube having slots 38 at its lower end might be replaced by a unslotted tube terminating sufficiently above the base to permit exit of ice from then tube bore 36 into the space 33. Also, a tube not extending below the table top 32 might be employed if secured to the table top to provide sufficient structural strength and dependent members could be located around the periphery of the ice tube beneath the false floor to deflect ice cubes from the bore of the ice tube into the space 33. Further, as depicted in FIG. 5, instead of using legs 34 to supporting the ice table 32 on the base 12, the internal surfaces of either or both pairs of side walls could be sloped so that the internal cross section of the ice chest 10 decreases toward the base 12, thereby enabling the table top 32 to be wedged in position at a suitable height above the base 12. Alternatively, as depicted in FIG. 6, ledges could be provided on the internal surfaces of either or both opposed pairs of side walls 14, 16 to support the table top 32. However, an advantage of the illustrated embodiment described above is that the ice table is self supporting and functionally independent of the ice chest 10 (other than having appropriate perimeter dimensions) and can more readily be sold as an accessory.

It is to be understood that the above description is intended to be illustrative and not restrictive. Many variations of the disclosed embodiments will become apparent to those of skill in the art upon review of this disclosure. The scope of the invention should, therefore, be determined not with reference to the above description but instead should be determined with reference to the appended claims along with their full scope of equivalents.

What is claimed is:

1. An insert for an ice chest having sidewalls upstanding from a base, comprising:

a table top having dependent support legs and an ice feed tube extending through the table top such that, in use of the insert, the table top is located within an ice chest with the support legs resting on the base and the table top perimeter adjacent side walls of the ice chest, spacing the table top from the ice chest base thereby permitting ice cubes fed into the feed tube from above the table top to pass through and exit the feed tube into the space between the table top and the base of the ice chest.

2. An insert according to claim 1, wherein the ice feed tube has peripheral sidewall slots at its exit end.

3. An insert according to claim 1, wherein the table top has a rectangular periphery and the support legs are located at or close to respective corners of the table top.

4. An insert according to claim 1, wherein the feed tube has a bore about 2–3 times the maximum linear dimension of ice cubes to be employed.

5. An ice chest comprising:

a container including an insulating base and insulating sidewalls upstanding from the base; and within the container;

a false floor supported in spaced relation from the insulating base and having a perimeter located close or adjacent to the insulating sidewalls;

an ice feed tube secured to the false floor, the feed tube having a bore opening into the space between the false floor and the insulating base and permitting passage of ice cubes through the bore into the space between the false floor and the insulating base, and wherein the false floor permits heat transfer across its thickness.

6. An ice chest according to claim 5, wherein the feed tube has a bore about 2–3 times the maximum linear dimension of ice cubes to be employed.

7. An ice chest according to claim 5, wherein the ice feed tube projects through the false floor into the space between the false floor and the insulating base.

8. An ice chest according to claim 5, wherein the ice tube includes sidewall openings permitting passage of ice cubes from the bore of the ice tube into the space between the false floor and the insulating base.

9. An ice chest according to claim 8, wherein the sidewall openings are located at or close to the insulating base.

10. An ice chest according to claim 5, including a plurality of members spaced around the periphery of the ice tube in the space between the false floor and the insulating base and projecting from the ice tube toward the insulating base, the spacing between the members accommodating passage of ice cubes from the ice tube.

11. An ice chest according to claim 5, wherein the ice tube has a circular section bore.

12. An ice chest according to claim 5, wherein the false floor is supported on the insulating base by a plurality of spaced apart support legs.

13. An ice chest according to claim 12, wherein the false floor is four sided and includes a support legs located at or near respective corners of the false floor.

14. An ice chest according to claim 5, wherein the container includes sloping sidewalls supporting peripheral portions of the false floor.

15. An ice chest according to claim 5, including opposed sidewall ledges supporting the false floor within the container.

16. A cooler comprising:

a container including an insulating base and insulating sidewalls upstanding from the base; and within the container, a false floor supported in spaced relation from the insulating base and having a perimeter located close or adjacent to the insulating sidewalls;

an ice feed tube secured to the false floor and extending on opposite surfaces of the false floor, the feed tube having sidewall openings located in the space between the false floor and the insulating base and permitting passage of ice cubes through the bore and the sidewall openings into the space between the false floor and the insulating base, and wherein the false floor permits heat transfer across its thickness.

17. A cooler according to claim 16, wherein the false floor has legs supporting the false floor form the container base.

18. A cooler according to claim 16, including a drain spigot in a sidewall of the container close to the container base.

19. A cooler according to claim 16, wherein the container includes a carrying handle operable to engage and lock a lid in position to close the container.

* * * * *